3,597,223
METHOD FOR PREPARING UNBROWNED BREAD LOAVES IN SLICED FORM
Albert J. Gordon, Studio City, Calif., assignor to Gordon Bread Company, Inc.
Filed June 30, 1969, Ser. No. 837,394
Int. Cl. A21d 8/06
U.S. Cl. 99—90R                                   5 Claims

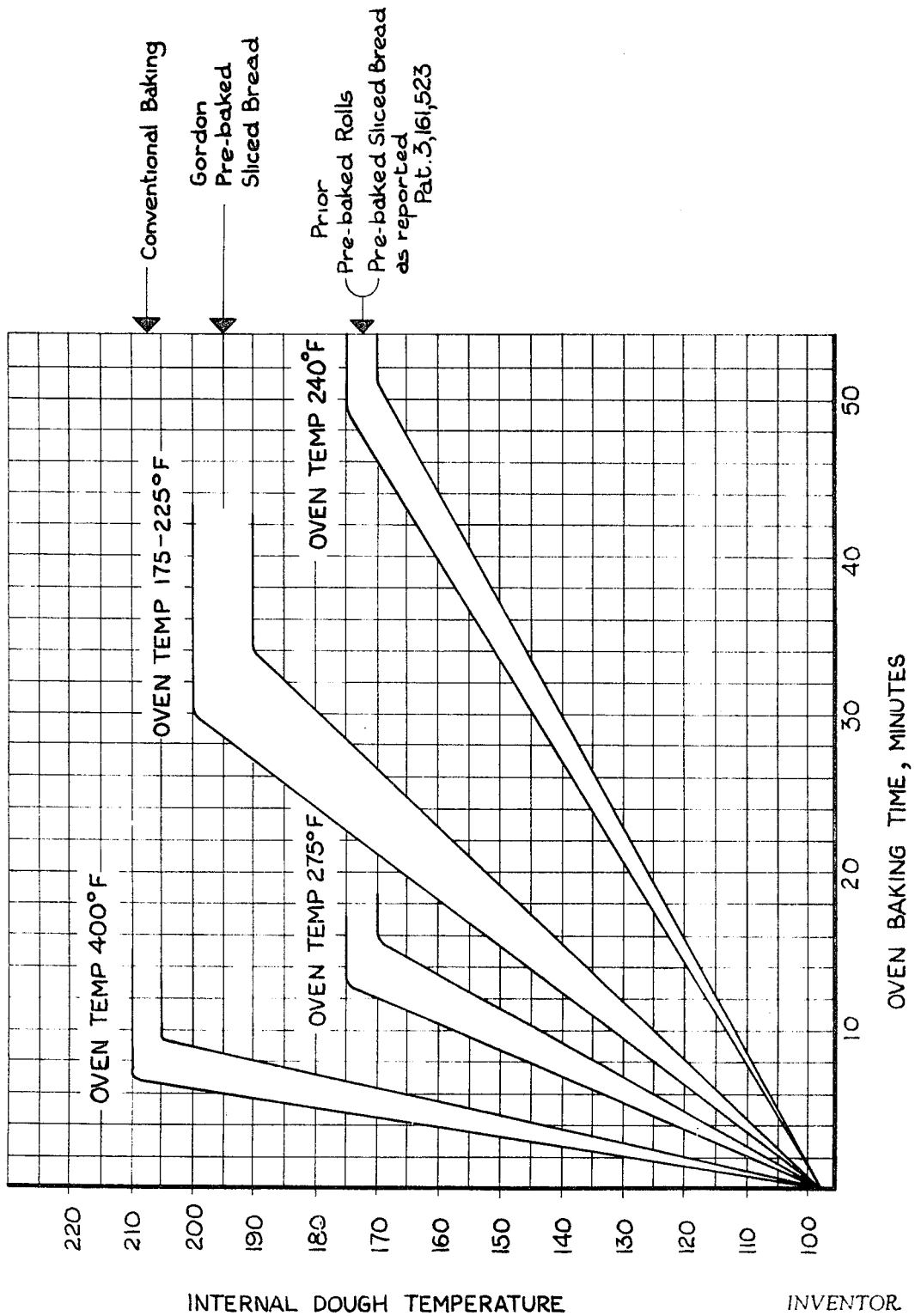

ABSTRACT OF THE DISCLOSURE

A method for preparing substantially unbrowned sliced bread loaves, intended for later browning by the consumer, wherein proofed loaves of the bread dough are heated for at least thrity minutes to an internal dough temperature of 190–200° F., whereupon heating is discontinued and the loaves are sliced to toast-sized pieces.

BACKGROUND OF THE INVENTION

(1) Field of the invention

The field of art to which the invention pertains includes the field of bread making.

(2) Description of the prior art

In recent years, a variety of semi-baked goods, such as dinner rolls and sweet rolls have been made available to the consumer. Such goods are sold to the consumer in a generally semi-baked and unbrowned form. The consumer heats the goods at a relatively high oven temperature to brown the exterior thereof and complete the baking of the goods, and can thus serve "freshly baked" bread or sweet rolls. These products are often referred to as brown-and-serve baked goods. Details of the preparation of brown-and-serve products can be found in U.S. Pat. No. 2,549,595 and U.S. Pat. No. 3,161,523.

In conventional baking, oven temperatures of about 400° F. are typically utilized to bake the goods to an internal temperature of between 205 and 210° F. The internal dough temperature indicates quite accurately the degree of internal cooking and small departures from narrow ranges of internal dough temperatures, particularly near a full-baked temperature, generally results in large differences in the texture, physical appearance and taste of the products. In conventional brown-and-serve methods, a much lower oven temperature is utilized, about 275° F., to drastically lower the internal temperature of the cooked dough, typically to between 170 and 175° F. Oven baking time is also generally increased. These conditions result in substantially complete gelatinization of the starch, liberation of carbon dioxide and arresting of yeast action. The product is semi-baked, but has sufficient rigidity to withstand removal from the oven and subsequent handling and packaging without collapsing.

The foregoing brown-and-serve methods have several drawbacks in that with conventionally prepared dough, pre-slicing for the consumer often cannot be accomplished and the final product is not tastefully edible in its semi-baked form, but must be baked by the consumer before it can be sliced and eaten. The consumer cannot utilize his toaster for the baking operation and must generally bake the entire loaf at one time. To eliminate these drawbacks and obtain a sliceable and toastable semi-baked product, methods of preparation have been proposed which eliminate the molding and overhead proofing steps of the conventional methods for dough preparation. This procedure is illustrated in Pat. No. 3,161,523, noted above. However, molding of dough squeezes out excess air and the elimination of this step results in bread with a course texture similar to hearth bread (e.g. French bread). It would be desirable to provide unbrowned bread in sliced form which is tastefully edible in such form (for those who would desire to have untoasted bread) and which can be browned in a toaster to yield bread slices which are similar in external texture and appearance to conventional toasted bread.

SUMMARY OF THE INVENTION

The present invention provides a method for preparing substantially unbrowned loaves of bread in sliced form which can be final baked in a slice toaster, which in its toasted form has the external texture and appearance of conventional toasted bread, and which in its untoasted form is tastefully edible and firm. It has also been found that toasted slices of bread prepared in accordance with this invention have a unique and delightful taste, brought on, it is thought, by the combination of firm exterior toasted texture and soft, somewhat moist interior. The total effect of the soft internal and firm external textures results in a unique taste not heretofore available. The product keeps for weeks without refrigeration, but may be frozen and then baked in a toaster without thawing so as to be "oven-fresh" when served.

Specifically, the method of this invention comprises a combination of several departures from prior art methods. One departure involves baking the dough to an internal temperature which is below that conventionally obtained for a fully baked product yet substantially above that obtained in conventional brown-and-serve methods. Specifically, the dough is baked to an internal temperature of 190–200° F. and this range is critical as well as utilizing an oven temperature sufficiently low so as to require at least thirty minutes to achieve this internal temperature. Another critical feature is that yeast bread dough is utilized which has less than 0.5 weight percent milk solids, and preferably substantially no milk solids. Such lmitation on milk solids allows the utilization herein of an internal dough temperature 190–200° F. without significant browning of the bread surface, and this is also enhanced by the utilization of less than conventional amounts of sugar. Another important distinction between the present invention and prior methods utilized for sliced bread (as in Pat. 3,161,523) is that in the present method the dough is molded to eliminate excess air.

BRIEF DESCRIPTION OF THE DRAWING

The single figure is a plot of internal dough temperature against oven baking time for conventional pre-baked rolls and sliced bread, and the present, Gordon pre-baked sliced bread.

DETAILED DESCRIPTION

In carrying out the method of the present invention, except where noted, convention and general principles of baking large quantities of bread are observed, and the method herein is readily adaptable to batch as well as continuous high production baking methods. As noted, one departure from conventional full-bake methods involves a drastic decrease in oven temperature and increase in baking time. This departure is practiced in general concept by prior pre-bake, brown-and-serve methods. However, in the present method, conditions are chosen so that the departure from conventional full-bake methods in terms of internal dough temperature is relatively small in comparison with the more drastic departure with prior pre-bake methods. Accordingly, in terms of internal dough temperature, which is recognized as an accurate gauge of cooking, the present product is close to conventional full-bake products, although in terms of oven temperature the method of preparation is closer to prior pre-bake methods. While the term "close" is utilized to orient the parameters of the present invention, the distinctions between conventional full bake and prior pre-bake products and processes are very critical and clearly demarcate the present invention.

Referring to the figure, the baking times of conventional bread and of prior pre-bake rolls and sliced bread are plotted against internal dough temperature (as reported in U.S. Pats. Nos. 2,549,595 and 3,161,523 noted above). The internal dough temperature of a baked article accurately indicates the approach to and attainment of the desired internal cooking. In conventional baking the dough is generally baked at an oven temperature of 400° F. for 7–8 minutes to achieve an internal dough temperature of 205–210° F., which indicates a fully cooked product. In prior pre-bake brown-and-serve methods, lower oven temperatures are utilized and the dough is heated for a longer time, but heating is discontinued when the internal dough temperature is at 170–175° F. The present process generally utilizes an even lower oven temperature, indicated as 175–225° F. in the figure. The bread is baked in a continuous process wherein it enters an oven at 175° F. and exits at 225° F. However, somewhat higher temperatures can be utilized provided they are below about 250° F. In different terms, the oven temperature for the particular system chosen, whether batchwise or continuous, should be such that an internal dough temperature of 190–200° F. is reached in no less than thirty minutes. This temperature range is quite critical for operation of the present invention as it is found that small deviations therefrom result in either browning of the product or an uncooked taste.

A further aspect of the invention relates to the utilization of a dough composition that is reduced in milk solids, and I have found that unless only small amounts of milk solids are utilized, the bread is browned when its internal temperature reaches 190–200° F. Accordingly, the dough should contain less than 0.5 weight percent milk solids, or can be substantially free of milk solids. It is also desirable to decrease the conventional amount of sugar to below about 2 weight percent of the dough.

An advantage herein, not obtained with prior processes, is that when utilizing this process with the foregoing limitations, one is not limited to unmolded bread, i.e., as described in U.S. Pat. No. 3,161,523. Indeed, the present process exhibits its finest qualities of appearance and taste when the dough is subject to molding and overhead proofing, and in this regard represents a distinct departure from the prior art.

The following examples will illustrate the utilization of the present process.

EXAMPLE 1.—WHITE BREAD

With a standard bakery mixer, the following ingredients are combined:

| | | |
|---|---|---|
| Water | lbs | 33 |
| Flour | do | 60 |
| Yeast | do | 1¾ |
| Yeast food | ozs | 7 |

The mixture is whipped at high speed for four minutes and taken from the mixer as sponge at 78° F. The sponge then sets for 3.5 hours in a fermentation room, at room temperature and comes out at a temperature of 86° F. The mixture is then taken to a dough mixer and the following ingredients are added:

| | | |
|---|---|---|
| Water | lbs | 24 |
| Flour | do | 40 |
| Salt | do | 2½ |
| Sugar | do | 2 |
| Honey | do | 1 |
| Inhibitor | ozs | 6 |
| Softener | lbs | 1 |

Calcium propionate is utilized as the inhibitor and a monoglyceride softener is utilized such as that sold under the trade name "Dovel." The entire mixture is then mixed at high speed for a period of 11 minutes and taken off at a temperature of 79° F. The dough is then immediately divided and scaled (if let set, automatic scaling would be inaccurate). The scaled dough is then taken to a rounder where it is shaped and floured (to prevent sticking) and then taken to an over-head proofer where it sets for seven minutes. Thereafter the dough is taken to molders where the loaves are sheeted and formed for panning. The loaves are panned and placed in a final proofer at 105° F. wet bulb-120° F. dry bulb, for 65 minutes. When the proofing is complete the bread is placed in a continuous oven, which is at 175° F. at the intake and 225° F. at the exit, and passes through the oven in 32 minutes, reaching an internal temperature of 195° F. The product is then removed from the oven and artificially cooled, sliced into conventional toast-size pieces and packaged for distribution to the consumer as pre-baked, unbrowned bread.

EXAMPLE 2.—WHEAT BREAD

The following ingredients are combined to form a sponge, in the manner of Example 1:

| | | |
|---|---|---|
| Water | lbs | 40 |
| Flour | do | 40 |
| Cracked wheat | do | 40 |
| Yeast | do | 3 |
| Yeast food | ozs | 10 |
| Margarin | lbs | 5 |

After setting as in Example 1, the following ingredients are added in a mixer:

| | | |
|---|---|---|
| Water | lbs | 16 |
| Whole wheat | lbs | 20 |
| Salt | lbs | 2⅓ |
| Sugar | lbs | 2 |
| Honey | lbs | 8 |
| Inhibitor | ozs | 6 |

This mixture is then handled and treated in the manner described in Example 1 to yield pre-baked, unbrowned whole wheat bread.

By following the foregoing process, one obtains a sliced, unbrowned bread which can be stored for several weeks without refrigeration and popped into a toaster to yield fresh-tasting delectible toast, firm on the exterior thereof but soft and moist on its interior.

What is claimed is:

1. The method for preparing substantially unbrowned, sliced bread loaves intended to be later browned which comprises:
   mixing a yeast bread dough having less than 0.5 weight percent milk solids;
   dividing said dough into loaf portions;
   proofing said dough into voluminous loaves;
   heating said proofed loaves for at least 30 minutes to an internal dough temperature of 190–200° F.;

discontinuing heating before said internal dough temperature rises above 200° F.; and slicing said loaves into toast-sized pieces.

2. The method of claim 1 including the step of molding said dough, prior to said proofing into voluminous loaves, whereby to eliminate excess air from said dough.

3. The method of claim 1 wherein said proofed loaves are heated at an oven temperature of less than 250° F.

4. The method of claim 1 wherein said dough is substantially free of milk solids.

5. The method of claim 1 wherein said dough has less than 2 weight percent sugar.

References Cited
UNITED STATES PATENTS

| | | | |
|---|---|---|---|
| 2,549,595 | 4/1951 | Gregor | 99—90R |
| 3,061,441 | 10/1962 | Halbach | 99—90NS |
| 3,161,523 | 12/1964 | Ort | 99—90R |

RAYMOND N. JONES, Primary Examiner

J. R. HOFFMAN, Assistant Examiner

U.S. Cl. X.R.

99—90CB